United States Patent [19]

DorEl

[11] Patent Number: 5,721,951
[45] Date of Patent: Feb. 24, 1998

[54] HOME ENTERTAINMENT SYSTEM FOR PLAYING SOFTWARE DESIGNED FOR PLAY IN HOME COMPUTER

[75] Inventor: Allen DorEl, San Gabriel, Calif.

[73] Assignee: Digital Interactive Corporation Systems, Ltd., Raanana, Israel

[21] Appl. No.: 394,366

[22] Filed: Feb. 24, 1995

[51] Int. Cl.$^6$ ........................................................ G06F 15/40
[52] U.S. Cl. .................................................................... 395/830
[58] Field of Search ................................ 395/154, 155, 395/156, 157, 159, 160, 161, 162, 800, 650, 821–832, 615, 488; 348/12, 13, 14, 7, 6, 8; 345/158, 169; 379/90; 369/32, 47, 53–54

[56] References Cited

U.S. PATENT DOCUMENTS

| | | | |
|---|---|---|---|
| 5,283,819 | 2/1994 | Glick et al. | 379/90 |
| 5,309,249 | 5/1994 | Ishii | 386/105 |
| 5,339,095 | 8/1994 | Redford | 345/158 |
| 5,426,762 | 6/1995 | Nakagawa | 395/442 |
| 5,539,449 | 7/1996 | Blahut et al. | 348/7 |
| 5,555,407 | 9/1996 | Cloutier | 395/615 |
| 5,601,435 | 2/1997 | Quy | 395/501 |

FOREIGN PATENT DOCUMENTS

| | | |
|---|---|---|
| 9321574 | 10/1993 | WIPO . |
| 9501058 | 1/1995 | WIPO . |

OTHER PUBLICATIONS

"Window 95: What's behind the Hoopla?", by Jim Boyce, Home PC, 1995, No. 20, p. 83.
"Your digital future", by Business Week, Sep. 7, 1992, p. 56, No. 3282.
"Multimedia Players", by Gellerman, Elizabeth, The Journal, v.21, n4, p14(4), Nov. 1993.
"Microsoft Modular Window", by Hemingway, Collins, CD-ROM World, v8, n3, p66(7), Apr. 1993.
"Electronics Journal", Electronics, v66, n4, p15(1), Feb. 22, 1993.
"Audioshow Combines VEA–to–TV Conversion with 16–Bit Sound", by O'Malley, Christopher, Computer Shopper, v14, n1, P868(3), Jan. 1994.
"Multimedia comes of age with solid products", by McCormick, John, Government Computer News, v11, n20, P27(2), Sep.28, 1992.
"Apple's new multimedia player platform", by McKenna, Patrick, Newsbytes, NEW 12130027, Dec. 13, 1994.
"An easy way to assemble multimedia shows" by Smarte, Gene, PC World, v11,n12, P118(1), Dec. 1993.
"Action–packed computing", by English, Arthur, DG Review, v12, n1, p. (4), Jul. 1991.

(List continued on next page.)

*Primary Examiner*—Moustafa M. Meky
*Attorney, Agent, or Firm*—Irell & Manella LLP

[57] ABSTRACT

A dedicated apparatus for playing unmodified prerecorded software in a home computer system, and more particularly an apparatus, housed in a home entertainment system chassis, for playing in a home entertainment environment the existing body of interactive multimedia software that has been formatted and published for compatibility with standard personal computer platforms such as the MPC CD-ROM platform. Video and audio output signals are generated in response to the processing of the multimedia software program, which are fed to the home entertainment system for presentation to an audience. A further aspect is the provision of a "drop & play" feature which automatically initiates playing of multimedia software in a sequence that appears to be similar to playing audio Cds, i.e., without requiring any further action from a user after selecting play. This feature is in part provided by a table containing installation information for each of numerous multimedia software titles; entries in this table are preferably indexed by an identifier that can be uniquely derived from a given CD-ROM or other published multimedia media such as a diskette.

36 Claims, 11 Drawing Sheets

OTHER PUBLICATIONS

"MPcOrganizer", by Huskin, David, Computer Shopper, V14, n3, p. 781(1), Mar. 1994.

"Sony ready to market multimedia player", by Woods, Wendy, Newsbytes, NEW 09040017, Sep. 4, 1992.

"Stay tuned for interactive TV", by Ratcliffe, Mitch, MacWeek, v6, n11, p1(2), Mar. 16, 1992.

International Search Report for Application No. PCT/IB 96/00386 Applicant: Digital Interactive Systems Corp.

Japanese Patent Abstract Publication No. JP7007683 to Matsushita Electric Ind Co Ltd.

HOME ENTERTAINMENT SYSTEM FOR PLAYING SOFTWARE DESIGNED FOR PLAY IN HOME COMPUTER

FIELD OF THE INVENTION

This invention relates to the field of interactive multimedia, and in particular to an apparatus for playing interactive multimedia programs on a television display.

BACKGROUND

During the last one or two years, one of the most important trends in the personal computer and consumer electronics industries has been explosive growth in the area of so-called multimedia software titles, which are typically distributed on CD-ROM discs and which emphasize interactive audiovisual content. A critical concern for hardware developers, software developers, and consumers is what platform will eventually emerge as the leading standard for viewing and interacting with multimedia software. Presently, the dominant platform appears to be the desktop multimedia personal computer—typically an IBM-compatible, Windows®-based multimedia computer system—perhaps because so many of these systems have already infiltrated homes and businesses for other purposes. An overwhelming majority of multimedia software titles are therefore published for this platform, and can only be played on compatible systems.

As a result of these trends, consumers will increasingly demand that the personal computer function as an entertainment system apparatus for playing and interacting with audiovisual compact discs, instead of as a machine for managing documents and performing desk work. However, because of its traditional role as a machine for performing tasks like document editing and spreadsheet calculation, the personal computer has generally been physically designed for desktop work, not for entertainment. Thus, both the hardware chassis as well as the user interface (e.g., mouse, keyboard, and VGA monitor) are generally built and integrated in a manner well-suited to a user sitting upright in an office chair working at a desk and staring at screens of documentary information at close range. The same is more or less true even for newer, portable "laptop" computers, which are not really comfortable for laps, but are rather suited for smaller desktop settings such as an airline seat and tray table. (Indeed, this very sentence is being written on just such a laptop, aboard an airplane.)

Preferably, consumers should be able to view and interact with multimedia software in the same relaxed comfort and manner in which they enjoy television, videos, and music, e.g., relaxing on a comfortable couch in the living room and watching images on a large screen television placed at a comfortable distance. Instead, because of the conventional, prior art architecture and design of personal computers, consumers must generally experience their multimedia titles in home office environments better suited for document work than for audiovisual entertainment.

Responding to this problem, a number of consumer electronics companies have recently begun selling proprietary multimedia game players, such as Phillips' CD-I player, Atari's Jaguar, and Panasonic's 3DO. However, although these platforms are designed to provide consumers with a more satisfactory entertainment viewing experience than the traditional desktop computer, they have generally been conceived and implemented as suis generis, special-purpose game machines, and have not been architected for compatibility with existing multimedia CD-ROM titles already published for the desktop PC platform. As a result, the limited availability of compatible software for these special-purpose game players is severely hampering the acceptance of such players among consumers.

Another possible response is to take an existing, desktop or laptop personal computer and augment it with bridging technology such as converter cards that can receive video output in standard personal computer format and convert it to television-compatible format (e.g., NTSC video), whereupon the video output may be routed on to a television monitor. A company called Antec apparently offers such a product, called the "TVator." This ad-hoc approach does allow users to view personal computer multimedia software on a television set, but still suffers from important limitations. For example, the ad-hoc bridging approach is unwieldy and cumbersome, because the traditional desktop computer platform is not physically designed for the home entertainment environment, and the computer chassis and cables are not physically designed for easy integration with a television set and other home entertainment components. In addition, the video converter card does not address the user interface problem; namely, a typical personal computer keyboard and mouse are extremely inconvenient, if not totally unworkable, for a home user sitting on a comfortable couch and watching a large screen television several feet away. These drawbacks may be major deterrents for the home consumer.

A related problem and limitation of prior art players for interactive multimedia CD-ROM titles is that the process of initiating the play of such titles is often cumbersome and confusing. Typically, in order to play an interactive multimedia CD-ROM disc using a conventional multimedia PC system, the user places the disc in a compact disc drive, and then commands the computer to "install" the title, which involves copying various files from the compact disc to the computer's hard disk drive, and setting the values of various system parameters. Commercially available titles often include interactive "scripts" and the like to facilitate this process somewhat. Nevertheless, the process of starting up an interactive CD-ROM title remains less comfortable for consumers than the simple technique of pushing a "play" button on a remote control or on the control panel of a typical home entertainment appliance such as a television set or audio compact disc player.

In view of these numerous limitations and drawbacks, an improved product for playing the existing body of interactive multimedia CD-ROM titles is greatly needed.

SUMMARY OF THE INVENTION

The present invention provides advantageous methods and apparatus for playing the large, existing body of interactive multimedia software programs that have been formatted and published for compatibility with standard personal computer platforms such as the MPC CD-ROM platform, for example.

The invention provides steps and means for conveniently integrating a player apparatus utilized to process and play multimedia software within the home entertainment environment. A processor capable of playing standard desktop computer multimedia software without alteration is housed in a home entertainment system chassis. Means are also provided for generating one or more video output signals and audio output signals in response to the processing of the multimedia software program, and feeding those audio and video output signals to one or more presentation devices integrated within a home entertainment system. The signals are preferably converted to an appropriate format, such as a television signal format, for the desired presentation devices.

A further aspect of the invention includes steps and means for responding to generic "play" commands from users by automatically initiating processing of multimedia software—including the performance of any requisite start-up or installation procedures—without requiring any further interaction or input by the user, thereby providing "drop & play" functionality as is characteristic of the traditional home entertainment environment. In part, this "drop & play" feature is provided by use of a look-up table or database containing installation information for each of numerous multimedia software titles; entries in this table are preferably indexed by an identifier that can uniquely be derived from a given CD-ROM or other multimedia medium.

Preferred features and embodiments of the present invention include providing a data communications link for receiving external data transmissions. In this way, and with the addition of various other steps and means as disclosed herein, the invention preferably provides a convenient access point to the information superhighway. Moreover, the invention offers an attractive platform for advanced capabilities including: interactive television services, video teleconferencing, and instant replay on demand of television transmissions—all preferably from a platform that is advantageously integrated within a traditional home entertainment center.

DETAILED DESCRIPTION OF THE INVENTION

Figure 1:
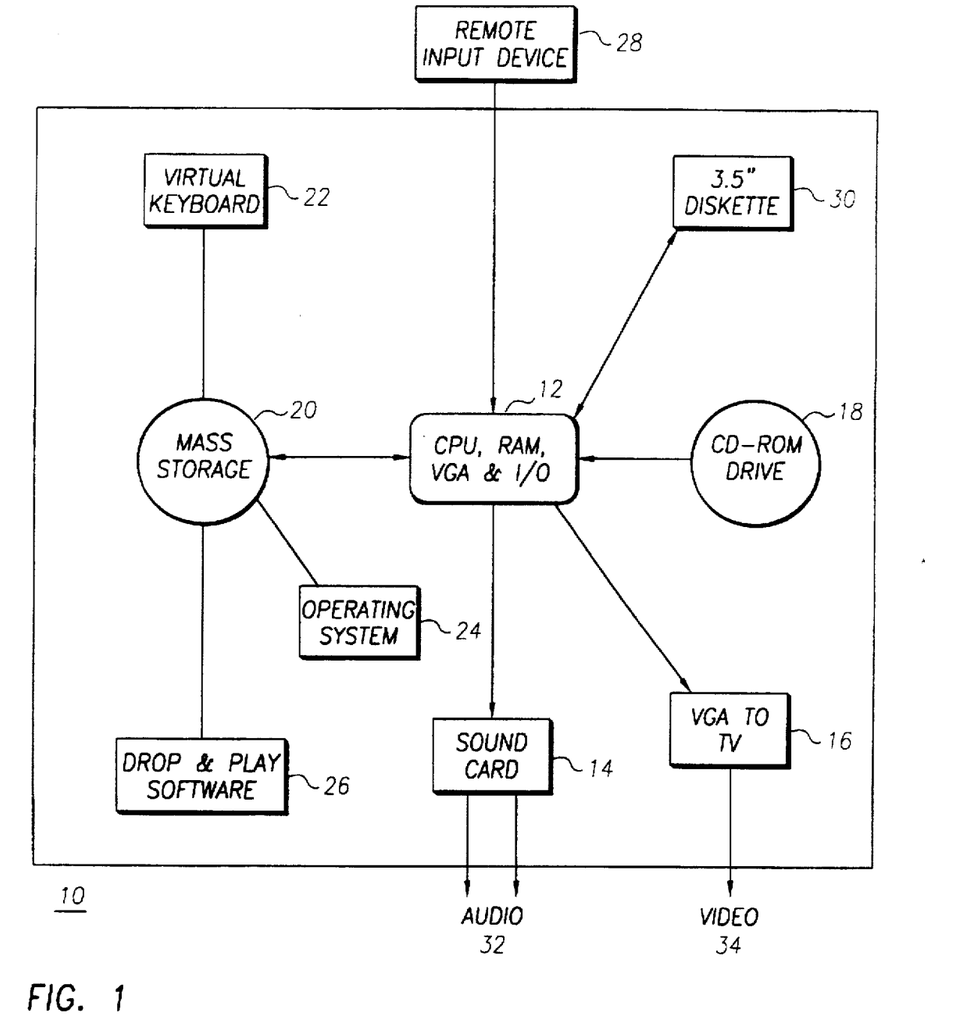
FIG. 1 illustrates the basic architecture of an interactive multimedia player for integration within a home entertainment system.

FIG. 1 illustrates the basic architecture of an interactive multimedia player in accordance with the present invention. The player is housed in player chassis 10. Unlike a conventional chassis for a prior art desktop computer or laptop computer, player chassis 10 is preferably a home entertainment system chassis, meaning its dimensions will fit atop a typical television set or otherwise fit smoothly into a typical home entertainment center. In other words, player chassis 10 is physically designed more or less like a VCR chassis, for convenient connection to a television set and for integration within a consumer home entertainment system. As shown further in FIG. 1, chassis 10 houses hardware and software sufficient to support MPC-compatible interactive multimedia ("MPC" is a well-known personal computer standard defined by the Multimedia PC Marketing Council). Accordingly, processor 12 preferably includes a CPU of the 25 MHz 486SX class or higher, at least four megabytes of internal RAM storage, 1 megabyte of video RAM storage, and standard I/O ports including ports for mouse input and for VGA video output; mass storage 20 preferably comprises a hard disk drive of at least 160 megabyte capacity; CD-ROM drive 18 preferably supports a sustained transfer rate of at least 300 kb/sec., with a maximum average seek time of 400 ms, is multi-session capable, and provides CD-DA output, such as a Sony double speed CD-ROM XA drive; sound card 14 is preferably a Sound Blaster or compatible card. Mass storage 20 stores various software for controlling the player system, including operating system 24 (preferably the Microsoft Windows® operating system, version 3.11 or greater, including multimedia drivers and extensions). The player of FIG. 1 also optionally includes auxiliary storage unit 30, such as a 3.5" diskette drive, for removable, archival storage, although this feature is not needed for MPC compatibility.

As shown further in FIG. 1, the capabilities of interactive multimedia player are enhanced by including within chassis 10 VGA-to-TV converter 16 (such as the ADS "TV Elite" card) for converting the VGA output signal of processor 12 into television signal 34, suitable for input to a television set (e.g., an NTSC or PAL signal, emitted as composite, S-VHS, or RF signal format). Thus, television signal 34 as well as audio output signals 32 may be connected via standard jacks or by any other suitable means to a desired television and audio amplifier/loudspeaker system, respectively. Alternatively, video output may be provided to a projection television system, for display on a large screen, which may be particularly advantageous in the context of an institutional user needing an interactive multimedia player for purposes of an educational lecture, a product demonstration, or a similar group presentation. In that case, the projector itself may conveniently be integrated with chassis 10, for better portability and compactness.

Figure 2:
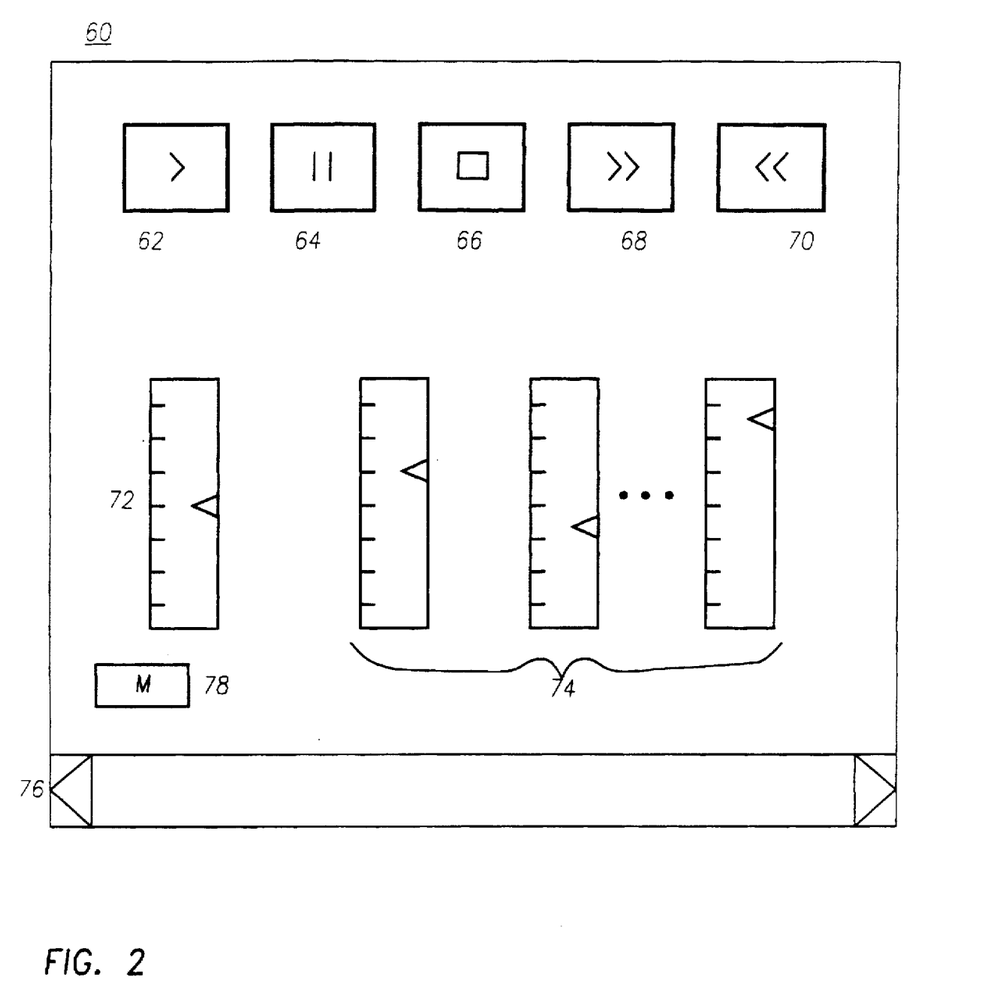
FIG. 2 illustrates a preferred embodiment of a virtual control panel for use with the present invention.

The present player also features an appropriate user interface so that the consumer who wishes to view and listen to his or her entertainment system from a comfortable distance and in a relaxed position, without having to balance a heavy keyboard on the user's lap. Conventional, corded keyboards and mouse devices are designed with flat-surfaced desktops in mind and are therefore not ideal for this context. Instead, as indicated in FIG. 1, user input is preferably entered by means of remote input device 28, such as an infra-red mouse (e.g., Interlink Electronics' RemotePoint) or other hand-held, remote control device that provides cursor control—unlike standard television or VCR remote control devices—in order to support interactivity with MPC multimedia software. In addition, mass storage 20 preferably stores software 22 for implementing a "virtual" on-screen computer keyboard, whose "keys" are "typed" using the cursor device, when needed for a particular multimedia title. FIG. 2 illustrates a preferred embodiment of an on-screen virtual control panel that is preferably provided in addition to a standard computer keyboard. The control panel includes one-touch virtual "buttons" for various playback functions, as will be described further below.

An important feature of the present player enables users to play interactive multimedia titles in the same, simple "drop and play" manner as they are accustomed to playing non-interactive audio compact discs, video discs, cassettes, and the like. Herein, we will refer to the user issuing a generic "play" command as meaning that initiating play of the current title requires only a generic, title-independent request by the user, such as the single-touch of a play button. By "current" title, we mean the title currently identified as the next title to be played, whether because the title currently resides in the system's CD drive, or because it is interactively selected by the user via menus or the like, or because it is identified by the system based on other criteria. The key point is that even though many MPC-compatible titles normally require the user's involvement in initialization and/or installation procedures, ranging from protocols for starting-up execution (such as invoking a particular operating system or program name) to complex installation procedures in accordance with the present invention such procedures (when needed) are performed automatically by the system without user involvement, preferably by "drop & play" software 26 as now described.

Figure 3:
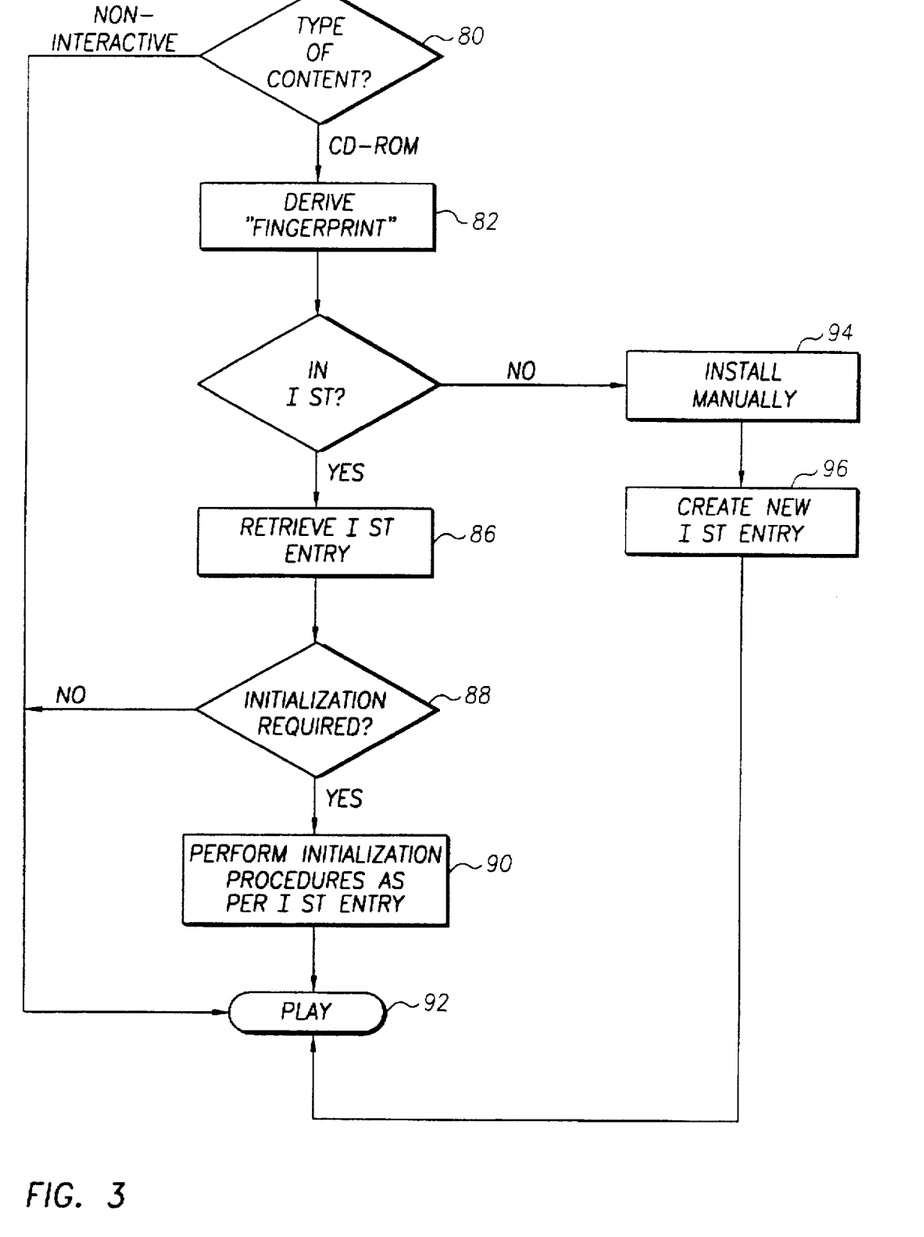
FIG. 3 is an illustrative flow chart of a basic method for providing "drop & play" functionality, in accordance with the present invention.
Figure 4:
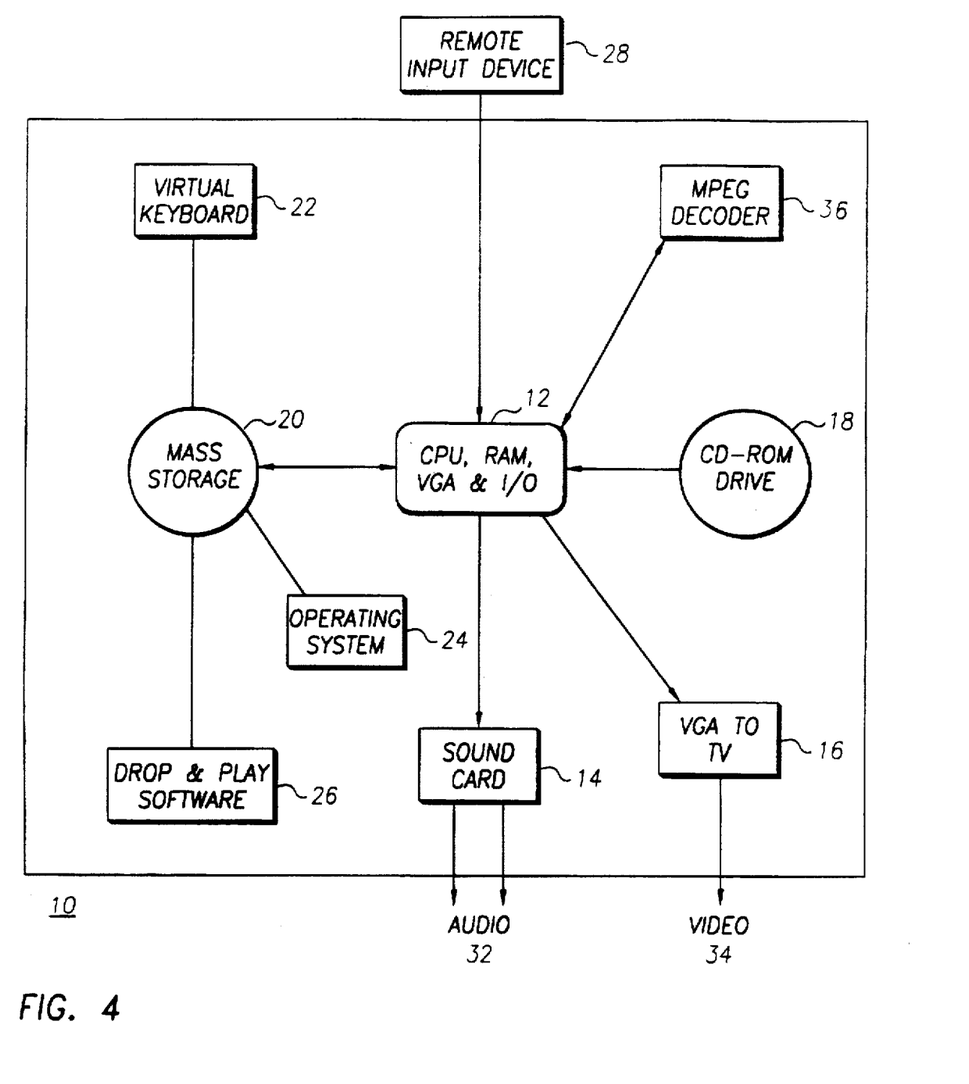
FIG. 4 illustrates a preferred embodiment of the present invention incorporating an MPEG video decoder.

In a preferred embodiment of the invention, drop & play software 26 is implemented by means of an Installation Status Table database or "IST." Each row of the IST stores installation information for a CD-ROM title recognized by the player. FIG. 3 shows a flow chart of steps to be performed by drop & play software 26, using an IST, to automate initialization and installation of the current CD-ROM interactive title after a user issues a "play" command. At step 80, a determination is made as to the general type or category of content in the current title to be played—e.g., whether the CD currently placed in CD-ROM drive 18 is an MPC interactive CD-ROM, a (non-interactive) video CD, a PhotoCD, or an audio CD, etc. If the CD is an MPC CD-ROM, then step 82 derives the identifier or "fingerprint" of the CD-ROM, preferably by computing a hash function derived from the file allocation table ("FAT") of the CD-ROM disc, since all MPC-compatible CD-ROM discs contain a unique FAT. Any other technique for uniquely identifying and indexing CD-ROM titles may equivalently be used, as those of ordinary skill in the art will readily appreciate.

At step 84, a determination is made as to whether the identifier derived for the current CD-ROM disc matches a value stored in the IST. If so, then the player "recognizes" this particular CD-ROM title, and at step 86, the information stored in the IST for the matching entry is retrieved and examined further. At step 88, a determination is made as to whether the matching entry indicates that some initialization procedure is required for this title. If no such initialization is required, then the player immediately begins to play the title at step 92. If the matching entry in the IST indicates that some initialization is required, then at step 90 all initialization procedures specified by the matching entry are performed. These procedures may include such tasks as, for example, executing a specified "run" protocol; copying files specified by the matching IST entry from the CD-ROM disc to mass storage unit 20 of the player, into directories as specified by the IST entry; or running an installation program and providing a script of specific or default responses in response to an installation program. Thereafter, the CD-ROM title begins to play, at step 92.

If the CD-ROM title is not stored in the IST, then at step 94 the user must manually install the title the first time the title is played, following the title's standard installation instructions. After this manual installation, drop & play software 26 of the present player preferably creates a new IST table entry for the title at step 96, including a description of relevant machine and file states affected by the installation procedure, so that the new title can thereafter be played using the fully automated drop and play procedure described above in steps 82–92.

Non-interactive audio CD (or video CD) can also be played on the present player with a simple "play" command, just like on a conventional home entertainment compact disc audio system. If the player recognizes, at step 80, that the compact disc placed in CD-ROM drive 18 contains non-interactive material such as a conventional audio CD, then no installation is necessary, and the player can immediately begin playback of the disc. Moreover, the player preferably provides additional control over playback of non-interactive titles, by means of a virtual control panel such as the control panel illustrated in FIG. 2.

Referring now to the details of FIG. 2, the function of Play Button 62 has already been described. Pause Button 64, Stop Button 66, Fast Forward Button 68, Fast Backward Button 70, Volume Control 72, and Equalizing Sliders 74 are all available when playing audio CD or video CD, and are all self-explanatory for those of ordinary skill and familiarity with conventional, consumer audio/video appliances. Slide Bar 76 shows the current play position of the CD, preferably including a time scale for both audio CD and video CD discs, and a track scale for audio CD. Slide Bar 76 can also readily be used to advance the play position forward or backward along the scale displayed, in well-known "scrolling" manner.

The control panel of FIG. 2 also preferably includes Mode Button 78, allowing users to select among various play modes for audio CD and video CD. At least four modes are preferably available for audio CD, and two modes for video CD, as follows:

For audio CD the 4 modes are:
  Playlist: user selects play order of tracks.
  Shuffle: the order of play is random.
  Once: the order of play proceeds from the first track on the disc to the last.
  Loop: the order of play proceeds from the first track on the disc to the last, and then repeats continually.

For Video CD the 2 modes available are:
  Once: the movie is played once, in order.
  Loop: the movie is repeatedly played in order.

As those of ordinary skill in the art will recognize, the virtual control panel described may readily be modified as dictated by the aesthetic or functional needs of particular applications. For example, the control panel can easily be adapted for use with a multi-disc changer, as by altering the behavior of "Playlist" mode to allow users to select a play order among all of the tracks stored on the multiple discs in the changer. Other control panel features could also be modified in similar fashion.

Thus, by means of the multimedia player of the present invention, and as illustrated above by way of example with FIGS. 1–3, the existing body of interactive multimedia titles written for desktop computer platforms may conveniently and comfortably be played in the preferred environment of a typical home audiovisual entertainment system.

Additional, enhanced embodiments of the invention can be advantageously created, as suggested and illustrated in FIGS. 4–10. For example, by including MPEG decoder 36 (such as the RealMagic decoder card by Sigma Designs) within the system as in FIG. 4, the interactive multimedia player can further be used to play full-length feature films stored as compressed MPEG data on CD-ROM discs, in a true home entertainment environment.

As will be illustrated in connection with FIGS. 5–7, the present player may also be advantageously enhanced by including a data communications link for receiving external data transmissions. External data transmissions received may then be processed using the computer power of processor 12, and then displayed and viewed in the advantageous context of a home entertainment setting, as described earlier. In this way, the present player effectively turns the home entertainment center into a convenient access point to the information superhighway.

Figure 5:
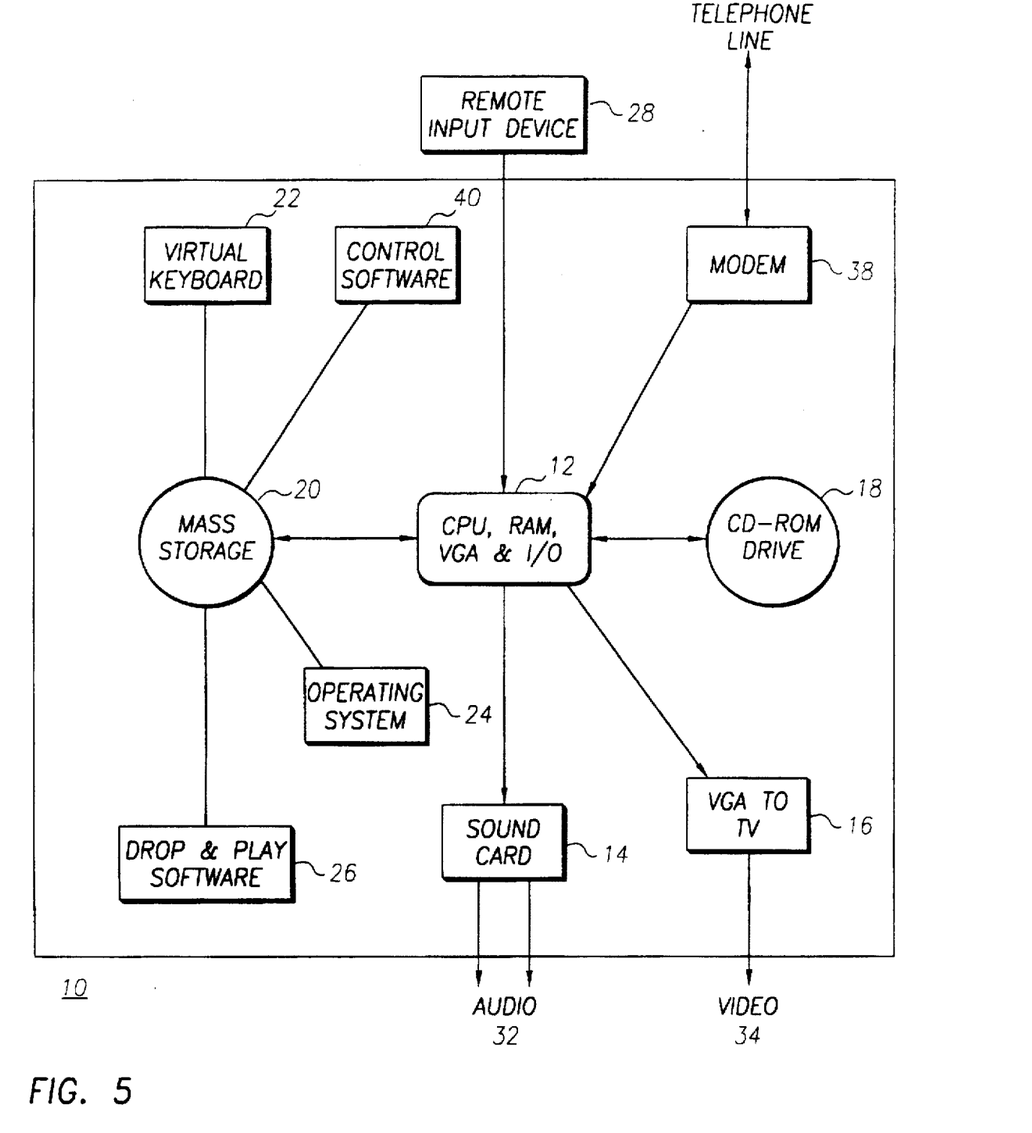
FIG. 5 illustrates a preferred embodiment of the present invention including a telecommunications link.

For example, in the embodiment of FIG. 5, the data communications link is provided by telecommunications link 38, e.g., a modem connected to a telephone line. In this way, the multimedia player of the present invention can conveniently be interconnected with wide area networks such as the Internet, Prodigy, Compuserve, America Online, etc., allowing the user to view and interact with audiovisual software products distributed through such wide area networks in the same manner as is presently done with personal computers, but with the advantage of utilizing a television and home entertainment system for viewing and interaction. Control software 40, such as the commercially available, MPC-compatible products provided by vendors like America Online, control such interactions. Similarly, with straightforward control software, the player system of FIG. 5 can easily be used to support menu-driven, automatic dialing of telephone numbers in a user's personal directory, and other telephone and facsimile services, but in the advantageous context of a home entertainment system rather than a conventional, desktop personal computer.

Figure 6:
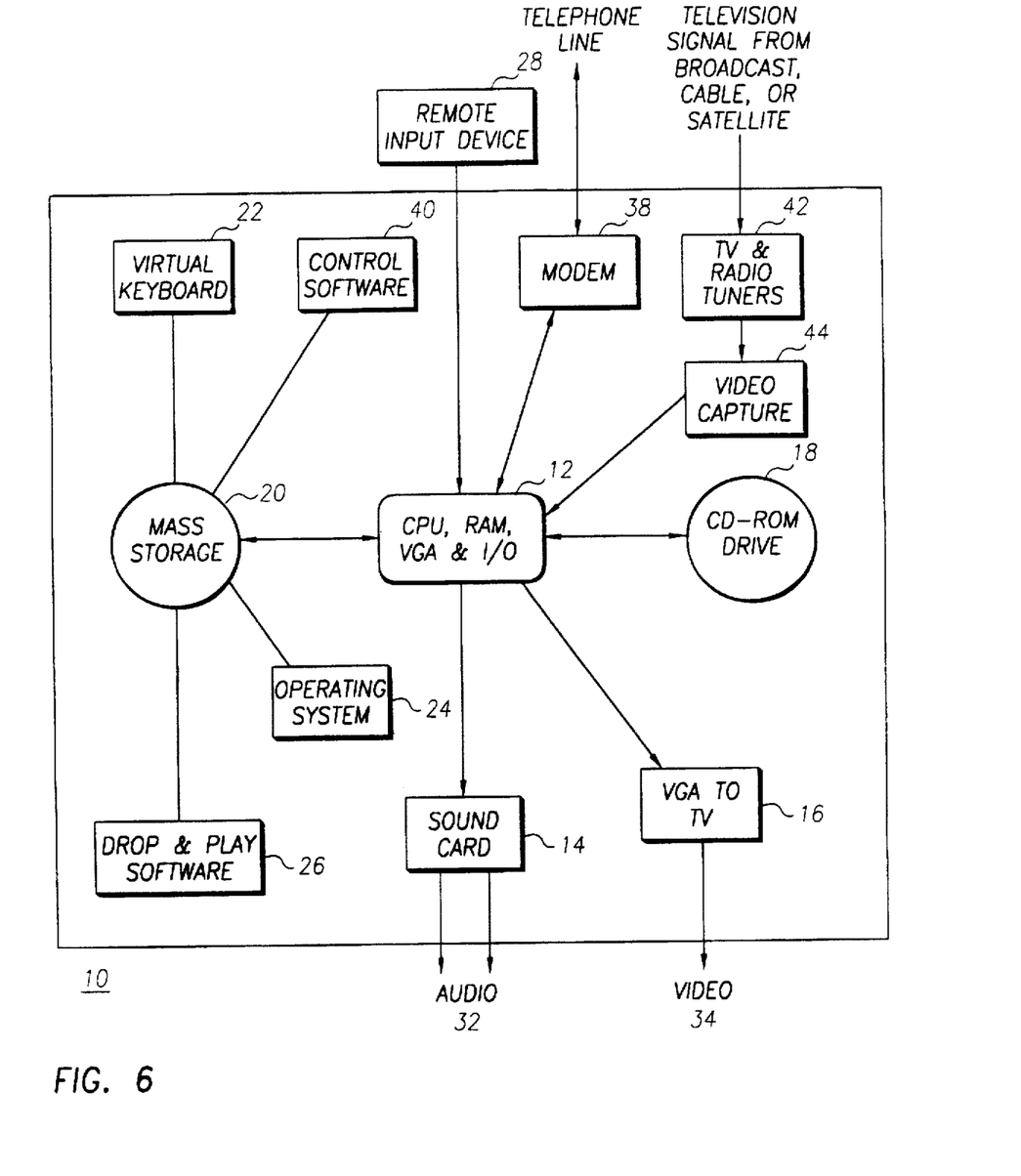
FIG. 6 illustrates a preferred embodiment of the present invention incorporating various means for providing multi-player games and other real-time interactive services.

Similarly, in the embodiment of FIG. 6, the data communications link is augmented with means for receiving television transmissions (e.g., broadcast, cable, or satellite signals) or radio transmissions by means of tuner 42. This embodiment preferably includes video capture board 44 for "capturing" any received television transmissions that are to be processed and presenting them to processor 12 in a suitable, digitized format. Telecommunications link 38 allows for transmission of data from the player to external recipients. Again, by further including control software 40 (or, equivalently, logic circuitry) as appropriate to process the television or radio transmissions, the viewer may enjoy the benefits of interactive television from the attractive and appropriate environment of a home entertainment system.

As just one example further illustrating the system of FIG. 6, a company called Interactive Network, Inc. broadcasts an FM radio signal simultaneously with many sports contests, game shows, and other real-time events that contains questions and answers about the event in progress. Interactive Network subscribers typically receive these signals using special-purpose control unit receivers, which process the signals and permit users to, for example, make predictions about the next play to occur in a professional football contest; NTN Communications, Inc. has created a popular interactive football game, "QB1," that has been used for this purpose. The correct answer to each question is transmitted shortly thereafter, and the control unit can then grade the user's answer and maintain a running score, effectively allowing users to "play along at home" while simultaneously viewing sports or other real-time events on television. For more details, see U.S. Pat. No. 4,592,546, entitled "GAME OF SKILL PLAYABLE BY REMOTE PARTICIPANTS IN CONJUNCTION WITH A LIVE EVENT," dated Jun. 3, 1986, naming Anthony Fascenda and David Lockton as inventors. The interactive player of FIG. 7 allows users to enjoy the benefits of interactive broadcasts, such as those provided by Interactive Network, Inc., within the attractive and familiar environment of their existing television and home entertainment system, and without the need for a separate "control unit" or the like. In this example, control software 40 of the player would contain game playing application software akin to that already provided in Interactive Network control units for interpreting the FM signal, and for generating the screen displays and scores required by games.

Figure 7:
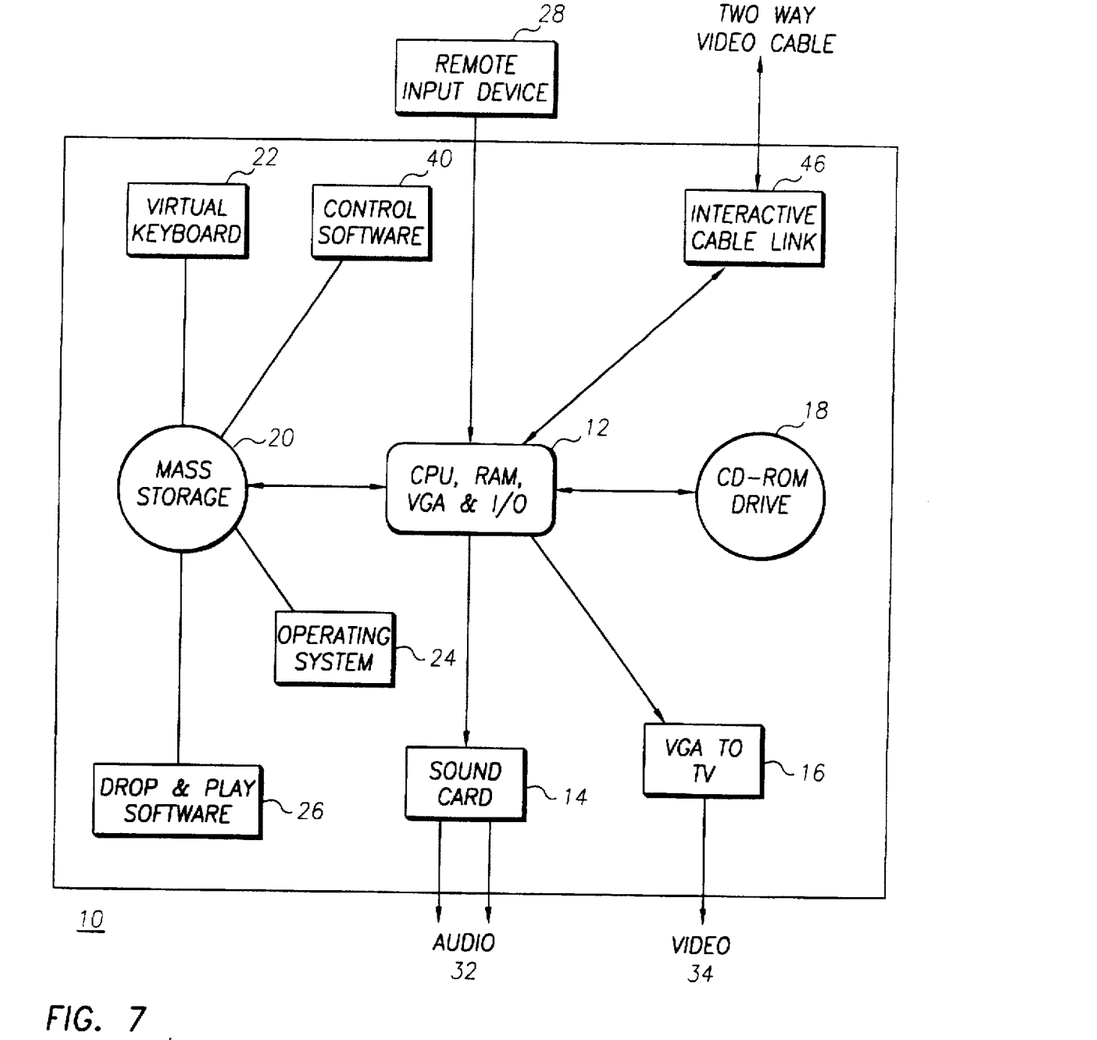
FIG. 7 illustrates an alternative preferred embodiment of the present invention for providing multi-player games and other real-time interactive services.

FIG. 7 illustrates an alternative to the embodiment of FIG. 6 for providing interactive television functionality. In the example of FIG. 7, the data communications link takes the form of two-way interactive cable video link 46, such as provided NetGame's "MUG" (Multi User Game) technology. Either through this embodiment or through the embodiment of FIG. 6, users will be able to fully enjoy interactive television programming—such as videos on demand, multi-user real-time video games, etc.—as such programming becomes more widely available, because the player of the present invention provides the power of a complete, MPC-grade digital computer, integrated within a home entertainment system. The player's computer power can be harnessed to render images, handle user interface processing, and perform other computations on each user's local player, in parallel, thereby greatly reducing communications traffic, reducing the required bandwidth, and increasing system efficiency, as those of skill in the art will readily appreciate.

Figure 8A:
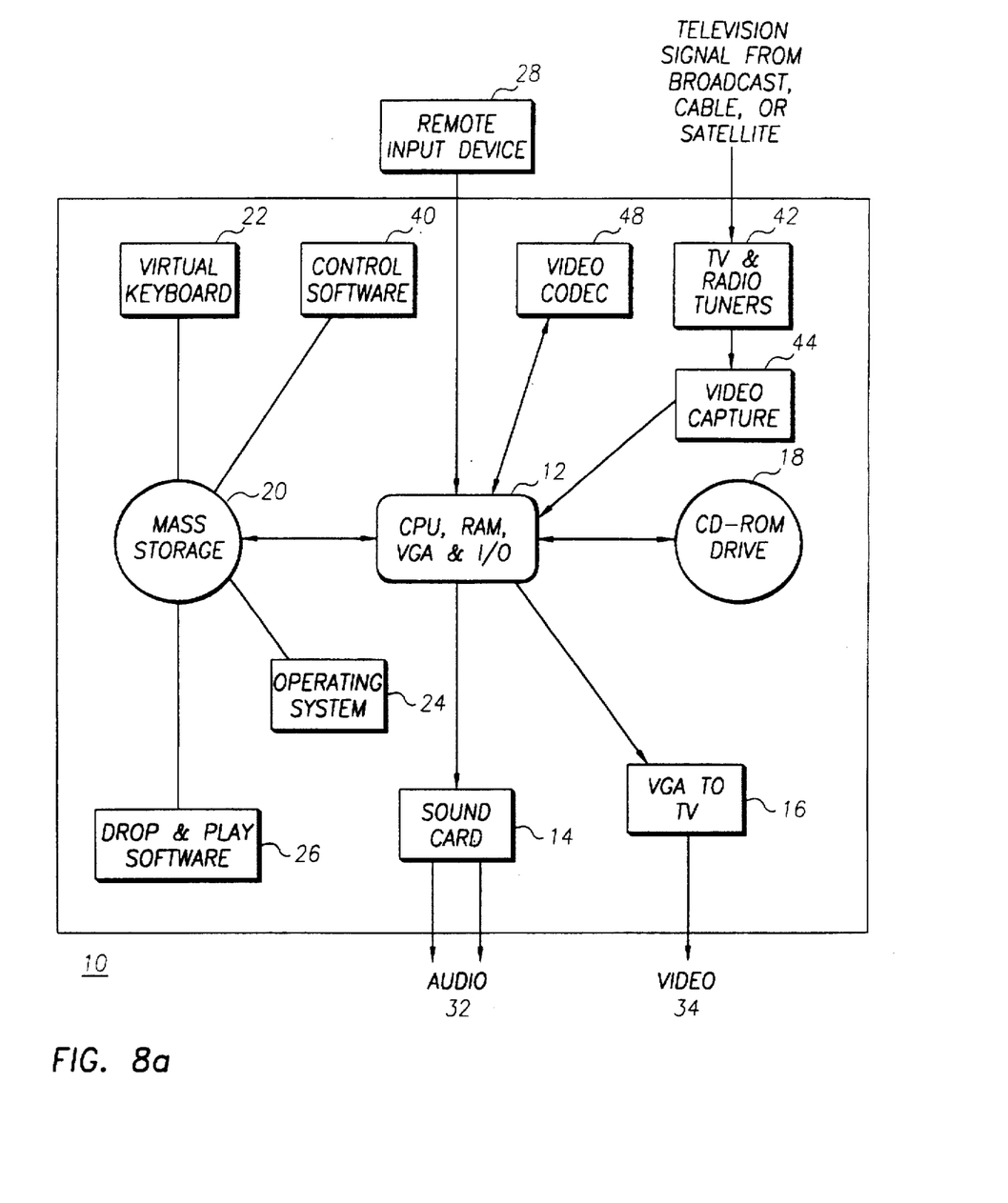
FIG. 8a illustrates a preferred embodiment of the present invention incorporating various means for providing an "instant replay" feature.

FIG. 8a shows another enhanced embodiment of the present invention, including video capture board 44, video compression codec 48, as well as tuner 42 for receiving television signals. With this embodiment, the current portion of a televised program is compressed using video codec 48, and cached in storage unit 20; this process proceeds continually, thus caching the last few minutes of the television program until they are gradually overwritten by more current data. Those of ordinary skill in the art will recognize that the amount of video programming that can be cached in this manner in storage unit 20 depends upon the capacity of the storage unit as well as on the degree of compression achieved by video codec 48; with current, commercially available technologies, storage of roughly the most recent sixty seconds of television programming should be possible.

Figure 8B:
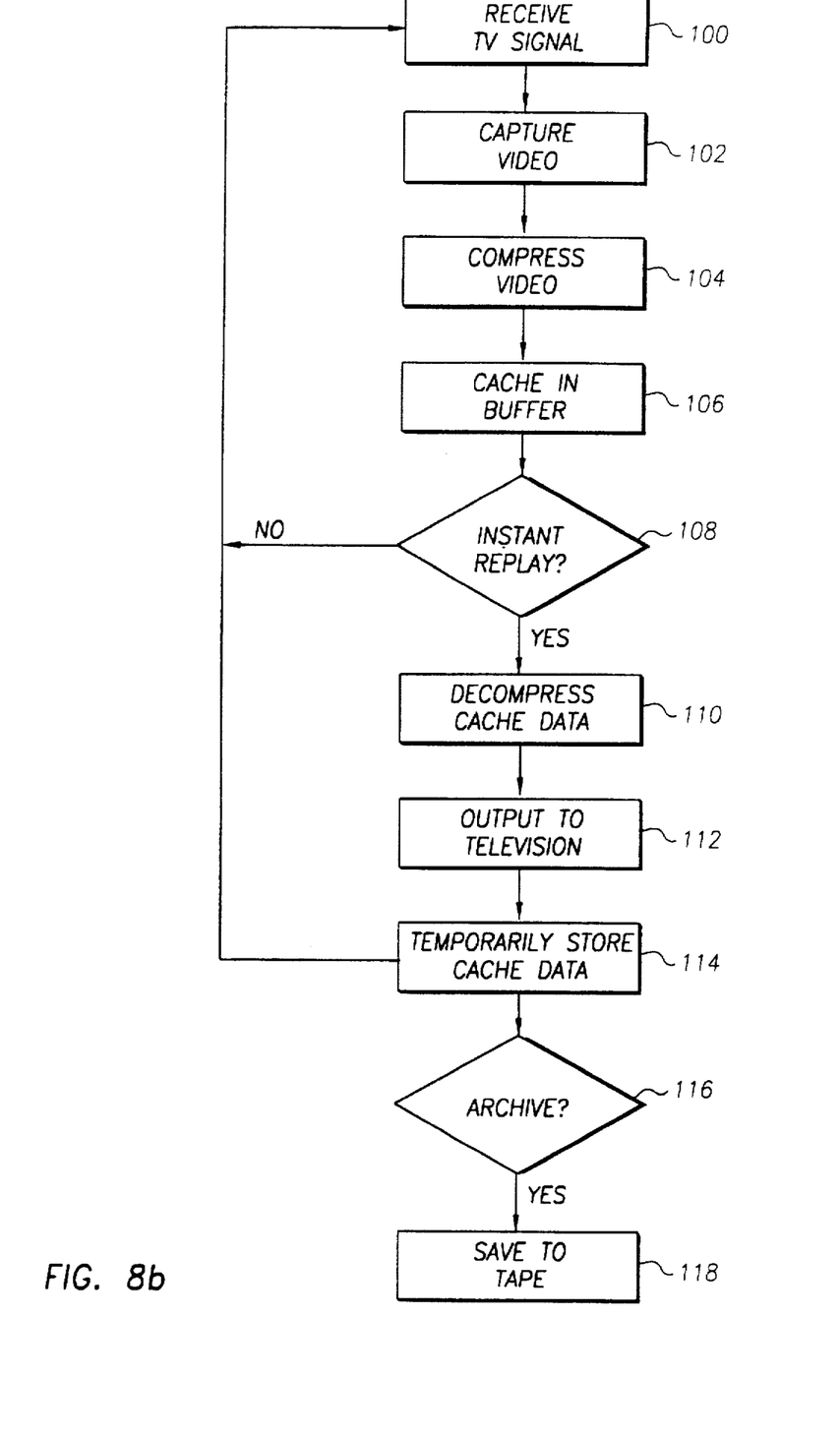
FIG. 8b illustrates steps preferably performed in accordance with the present invention for providing an "instant replay" feature.

With this video capture capability, the present player provides a revolutionary and advantageous feature of instant television replay on demand (as well as permanent archival storage thereafter if desired) of a short program highlight, though the user's VCR was not actively recording at the actual moment the highlight occurred. A method for implementing the instant playback feature is described further in the flow diagram of FIG. 8b. At step 100, tuner 42 receives a television signal; at step 102, the signal is presented to processor 12 by video capture board 44 in a suitable digital format. The signal is compressed by video codec 48 at step 104, and cached in storage unit 20 (still in compressed form) at step 106. At decision point 108, if a user requests instant replay, then at step 110 the cached data is decompressed by video codec 48 and is replayed on the television at step 112, preferably in a partitioned on-screen window if the user's television supports multi-window display. Concurrently, at step 114, the cached data is immediately stored to a protected area of storage unit 20. Preferably, at step 116, if the user requests permanent storage of the highlight, the cached data is then output to auxiliary storage unit within the home entertainment system, such as digital video tape. Meanwhile, whether or not instant replay has been requested, the process of caching the most recent programming continues without significant interruption, as depicted in FIG. 8b.

Figure 9:
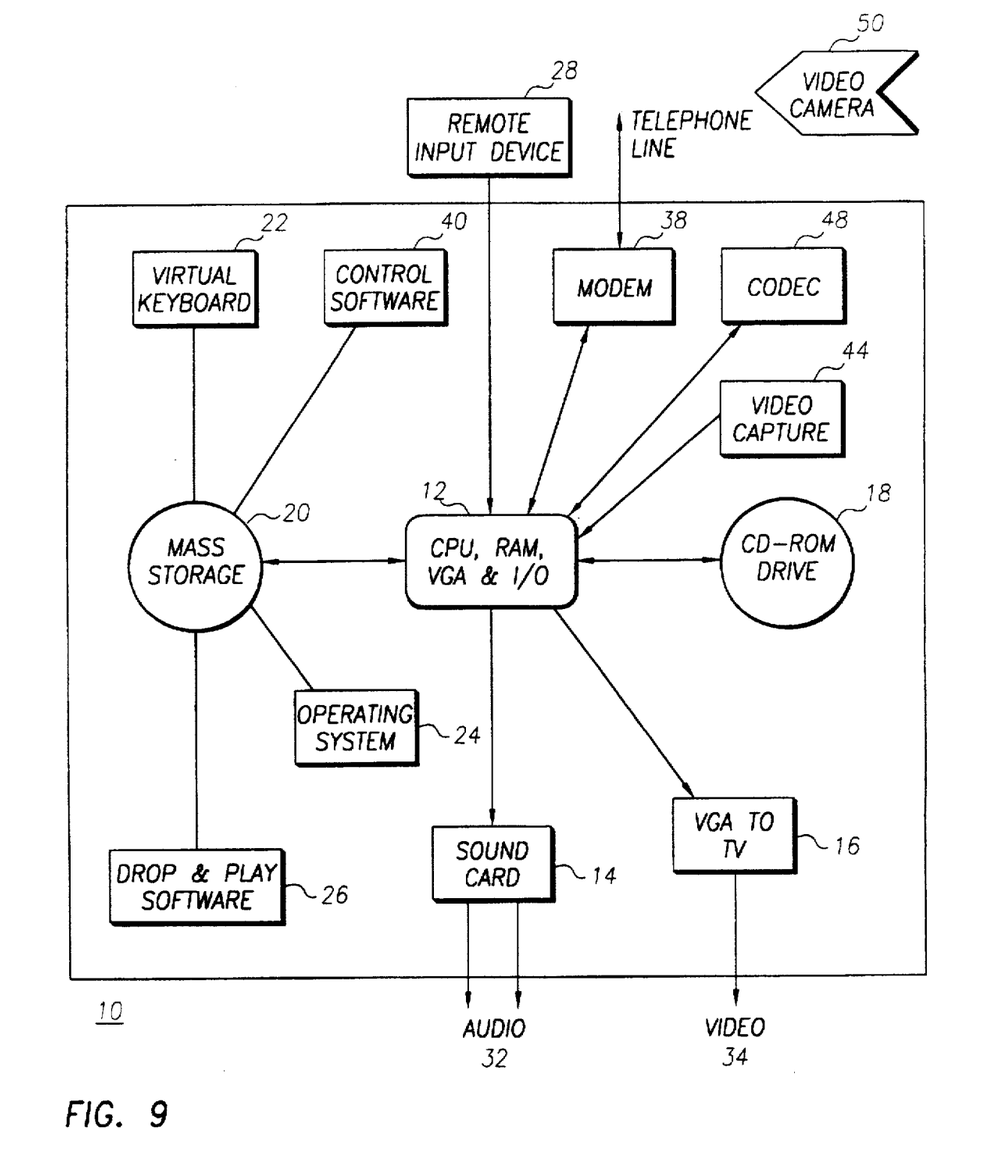
FIG. 9 illustrates a preferred embodiment of the present invention for providing video teleconferencing.

FIG. 9 illustrates a further enhanced version of the present invention including video camera 50, so that the present player can be used to provide video teleconferencing services. For example, if two users are both equipped with the system of FIG. 9, a teleconference session can be established between the users by using their respective telecommunications links 38. Video camera 50 records input images of each user, and the images are periodically captured and compressed using video capture board 44 and video codec 48, and are transmitted across the telephone network between the respective telecommunications links 38. The images received by each user are decompressed using video codec 48, and displayed on the user's television set by the present player concurrently with the telephone call. The audio portion of the telephone call may be output by the player through the user's home audio system.

Figure 10:
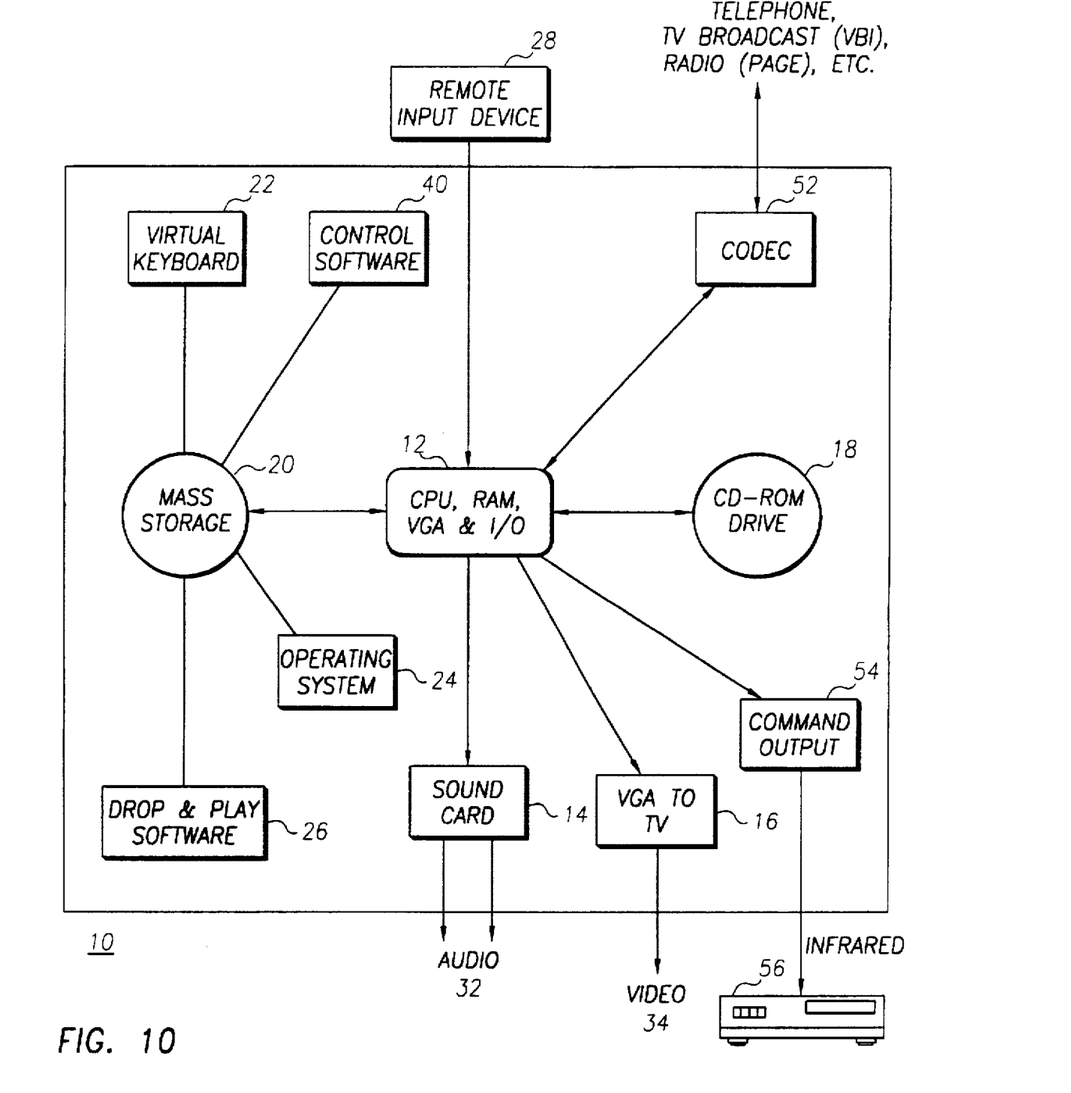
FIG. 10 illustrates a preferred embodiment of the present invention for remotely controlling other appliances within a home entertainment system.

FIG. 10 illustrate a preferred embodiment of the present invention which further includes command output device 54 for controlling other appliances within a home entertainment system. Command output device 54 preferably emits an infra-red signal compatible with the remote control operation of other appliances within the home entertainment system such as VCR 56. In this way, computer software can be executed on the player providing menu-driven, interactive, remote control of VCR 56 or other entertainment appliances. As an example, the player of FIG. 10 can advantageously control a television set and VCR if control software 40 (and associated control logic) of the player is equipped to receive broadcasts of television program guide information such as provided by the "StarSight" system.

In the embodiment of FIG. 10, control software 40 internally formulates appropriate commands for the desired appliance, depending on the menu-driven input provided by the user. Command output device 54 will then output these commands so as to control the appliance, e.g, the VCR will automatically be programmed for timed recording as desired by user. Thus, software can be written with the full complexity and richness supported by processor 12 and operating system software 24 (i.e., preferably the full potential of MPC-compatible software) so as to facilitate centralized, user-friendly, interactive control of any desired appliance within the user's home entertainment system.

Other embodiments and modifications within the spirit of the present invention will occur to those of ordinary skill in the art in view of these teachings, including but not limited to using additional or alternative system components; providing support for additional or alternative computer entertainment functions; and providing compatibility with additional or alternative platforms. Such embodiments remain within the scope of the present invention, to the extent they fall within the scope of the following claims.

I claim:

1. A multimedia apparatus configured for use in a home entertainment system, said apparatus comprising:
   reading means for receiving a portable recording medium and reading a software program stored thereon;
   a processing device structured configured to identify the software program being read by the reading means and whether said software program needs to be installed or has already been installed, and it need to be installed, whether installation information relating to the software program be read by the reading means is available to the processing device to be used to perform an automatic installation of the software program, said processing device further and configured to begin playing the software program if it has already been installed or automatically initializing an installation of the software program prior to playing the software program if the installation information is available; and
   output means for providing audio and image data resulting from the playing of the software program to the home system.

2. A multimedia apparatus as in claim 1, wherein the reading means is a CD-ROM drive and the portable recording medium is a CD-ROM.

3. A multimedia apparatus as in claim 1, further comprising a database containing installation information relating to software programs identifiable for playing by the multimedia apparatus, wherein the processing device is structured and configured to determine whether installation information relating to the software program being read by the reading means is available to the processing device by looking up the database.

4. A multimedia apparatus as in claim 3, wherein the database includes an installation status table containing installation information for particular software programs identifiable by the multimedia apparatus.

5. A multimedia apparatus as in claim 1, wherein the processing device is structured and configured to identify said software program by deriving a unique identifier from unique elements intrinsic to said software program.

6. A multimedia apparatus as in claim 5, wherein the processing device is further structured and configured to match said unique identifier to the installation information in the database.

7. A multimedia apparatus as in claim 5, wherein the processing device is further structured and configured to derive said unique identifier by computing a hash function derived from a file allocation table of the portable recording medium.

8. A multimedia apparatus as in claim 1, wherein the processing device is configured and structured to be backward compatible to play those software programs that are formatted to be executed on at least one personal computer platform without requiring prior modification to such software programs.

9. A multimedia apparatus as in claim 8, wherein the processing device is compatible with MPC (multimedia personal computer) standard.

10. A multimedia apparatus as in claim 1, wherein the processing device is structured and configured to identify the software program independent of external networks.

11. A multimedia apparatus as in claim 1, wherein the output means is structured and configured to provide the image data in a format compatible for display by a television monitor in the home entertainment system.

12. A multimedia apparatus as in claim 1, wherein the processing device is structured and configured to perform personal computer tasks and the output means is structured and configured to provide the image data in a format that does not require a computer monitor.

13. A home entertainment system comprising:
   input means for receiving user commands;
   display means for presentation of image data;
   audio means for presentation of audio data;
   one or more audio or video components for playing audio or video recordings; and a multimedia apparatus having capability of playing software programs, comprising:

reading means for receiving a portable recording medium and reading a software program stored thereon;

a processing device structured and configured to identify the software program being read by the reading means and determine whether said software program needs to be installed or has already been installed, and should it need to be installed, whether installation information relating to the software program being read by the reading means is available to the processing device to be used to perform an automatic installation of the software program, said processing device further structured and configured to begin playing the software program if it has already been installed or automatically initializing an installation of the software program prior to playing the software program if the installation information is available; and output means for providing audio and image data resulting from the playing of the software program to the audio means and the display means.

14. A home entertainment system as in claim 13, wherein the reading means is a CD-ROM drive and the portable recording medium is a CD-ROM.

15. A home entertainment system as in claim 13, further comprising a database containing installation information relating to particular software programs identifiable for playing by the multimedia apparatus, wherein the processing device is structured and configured to determine whether installation information relating to the software program being read by the reading means is available to the processing device by looking up the database.

16. A home entertainment system as in claim 15, wherein the database includes an installation status table containing installation information for particular software programs identifiable by the multimedia apparatus.

17. A home entertainment system as in claim 13, wherein the processing device is structured and configured to identify said software program by deriving a unique identifier from unique elements intrinsic to said software program.

18. A home entertainment system as in claim 17, wherein the processing device is further structured and configured to match said unique identifier to the installation information in the database.

19. A home entertainment system as in claim 17, wherein the processing device is further structured and configured to derive said unique identifier by computing a hash function derived from a file allocation table of the portable recording medium.

20. A home entertainment system as in claim 13, wherein the processing device is configured and structured to be backward compatible to play those software programs that are formatted to be executed on at least one personal computer platform without requiring prior modification to such software programs.

21. A home entertainment system as in claim 20, wherein the processing device is compatible with MPC (multimedia personal computer) standards.

22. A home entertainment system as in claim 13, wherein the processing device operates independent of external networks.

23. A home entertainment system as in claim 13, wherein the output means is structured and configured to provide the image data in a format compatible for display by a television monitor in the home entertainment system.

24. A home entertainment system as in claim 13, wherein the processing device is structured and configured to perform personal computer tasks and the output means is structured and configured to provide the image data in a format that does not require a computer monitor.

25. A method of executing software program in a home entertainment system, said method comprising the steps of:

providing a reading means for receiving a portable recording medium and reading a software program stored thereon;

identifying the software program being read by the reading means;

determining whether the software program needs to be installed or has already been installed, and should it need to be installed, whether installation information relating to the software program being read by the reading means is available to be used to perform an automatic installation of the software program;

beginning the playing of the software program if it has already been installed or automatically initializing an installation of the software program prior to executing the software program if the installation is available; and providing audio and image data resulting from the playing of the software program to the home entertainment system.

26. A method as in claim 25, wherein the reading means is a CD-ROM drive and the portable recording medium is a CD-ROM.

27. A method as in claim 25, wherein the step of determining comprises the steps of:

storing in a database installation information relating to particular software programs identifiable for playing; and looking up the database to determine whether installation information relating to the software program being read by the reading means is contained in the database.

28. A method as in claim 27, wherein the database includes an installation status table containing installation information for particular software programs.

29. A method as in claim 25, wherein the identifying step comprises the step of deriving a unique identifier from unique elements intrinsic to said software program.

30. A method as in claim 29, wherein the software program is identified by matching said unique identifier to the installation information in the database.

31. A method as in claim 29, wherein the unique identifier of the software program is derived by computing a hash function derived from a file allocation table of the portable recording medium.

32. A method as in claim 25, wherein the playing step is performed by a processing device which is configured and structured to be backward compatible to play those software programs that are formatted to be executed on at least one personal computer platform without requiring prior modification to such software programs.

33. A method as in claim 32, wherein the processing device is compatible with MPC (multimedia personal computer) standards.

34. A method as in claim 25, wherein the determination step is independent of external networks.

35. A method as in claim 25, wherein the image data provided is structured and configured in a format compatible for display by a television monitor in the home entertainment system.

36. A method as in claim 25, further comprises the step of configuring to perform personal computer tasks and the image data is provided in a format that does not require a computer monitor.

* * * * *

UNITED STATES PATENT AND TRADEMARK OFFICE
CERTIFICATE OF CORRECTION

PATENT NO. : 5,721,951
DATED : February 24, 1998
INVENTOR(S) : Allen DorEl

It is certified that error appears in the above-identified patent and that said Letters Patent is hereby corrected as shown below:

Title page,
Item [73], Assignee, replace "Digital Interactive Corporation Systems, LTD.," with -- Digital Interactive Systems Corporation, LTD., --.
Item [57], ABSTRACT, replace "appears to be similar to playing audio Cds, i.e., without" with -- appears to be similar to playing audio CDs, i.e., without --.

Column 9,
Line 63, replace "a processing device structured configured to identify" with -- a processing device structured and configured to identify --.
Line 64, replace "software program being read by the reading means and" with -- software program being read by the reading means and determine --.
Line 66, replace "has already been installed, and it need to be installed" with -- has already been installed, and should it need to be installed --.

Column 10,
Line 1, replace "ware program be read by the reading means is available" with -- ware program being read by the reading means is available --.
Line 4, replace "processing device further and configured to begin" with -- processing device further structured and configured to begin --.

Signed and Sealed this

Twenty-ninth Day of June, 2004

JON W. DUDAS
*Acting Director of the United States Patent and Trademark Office*